(12) United States Patent
Kakehi

(10) Patent No.: US 11,328,378 B2
(45) Date of Patent: May 10, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Rumiko Kakehi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 278 days.

(21) Appl. No.: 16/554,534

(22) Filed: Aug. 28, 2019

(65) Prior Publication Data

US 2020/0074580 A1 Mar. 5, 2020

(30) Foreign Application Priority Data

Sep. 5, 2018 (JP) .............................. JP2018-166231

(51) Int. Cl.
*G06T 1/00* (2006.01)

(52) U.S. Cl.
CPC ...... *G06T 1/00* (2013.01); *G06T 2207/10016* (2013.01); *G06T 2207/20092* (2013.01); *G06T 2207/20224* (2013.01)

(58) Field of Classification Search
CPC ............. G06T 1/00; G06T 2207/10016; G06T 2207/20224
See application file for complete search history.

(56) References Cited

U.S. PATENT DOCUMENTS

2010/0247063 A1* 9/2010 Matsuhara ........... G11B 27/036
386/333

FOREIGN PATENT DOCUMENTS

JP 4292902 7/2009

* cited by examiner

*Primary Examiner* — Myron Wyche
(74) *Attorney, Agent, or Firm* — JCIPRNET

(57) ABSTRACT

An information processing apparatus includes a reception section that receives an editing instruction with respect to an arrangement configuration of a still image including plural pages, and a generation section that generates a moving image which corresponds to the arrangement configuration of the still image edited due to the editing instruction and which is acquired through combination with a moving image including playback sections corresponding to the still image.

20 Claims, 13 Drawing Sheets

FIG. 13A
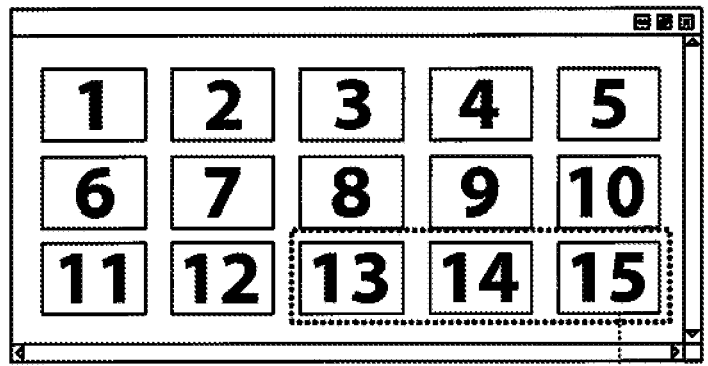
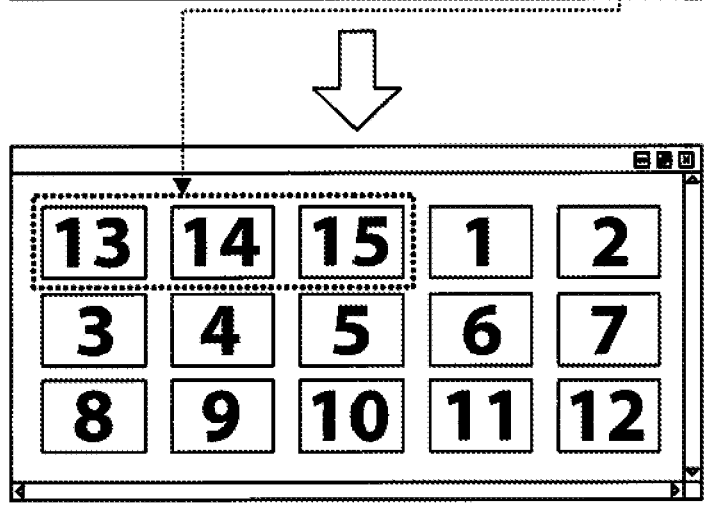
FIG. 13B
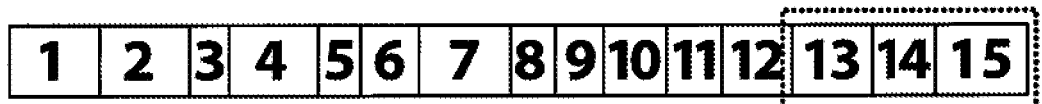
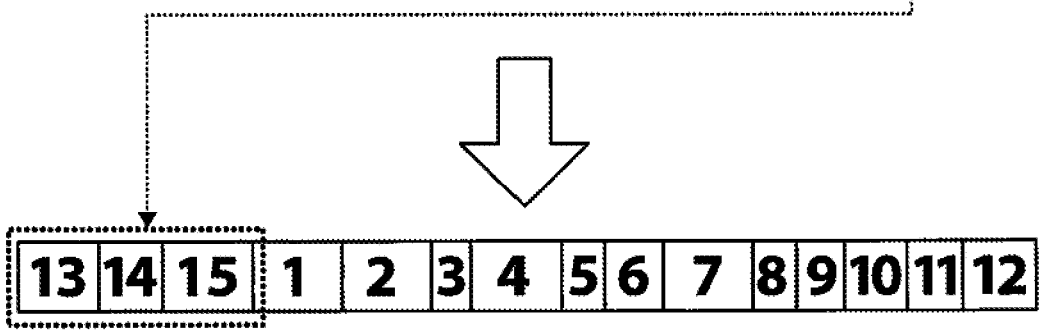

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-166231 filed Sep. 5, 2018.

BACKGROUND

(i) Technical Field

The present invention relates to an information processing apparatus and a non-transitory computer readable medium storing a program.

(ii) Related Art

JP4292902B includes a content editing device that performs processing of receiving designation of a part, which is removed, of video data, determining material image data associated with the part, which is designated to be removed, of the video data, and a time location of addition image data which is associated with the material image, recoupling the video data after removing the part, which is designated to be removed, of the video data, and updating the material image data corresponding to the part, which is removed, and the associated time location of the addition image data in response to the part, which is removed, thereby editing content which includes the video data and the material image data associated with a time location of the video data while maintaining a reasonable relation in a case where a correspondence relation therebetween is read as the content.

SUMMARY

There is a case where a still image, which is described in a moving image, or a still image, which is used to describe the moving image, is associated with the moving image. Here, in a case where the still image is switched over or removed, it may be desired to edit the moving image in synchronization with the switching over or the removal of the still image.

Aspects of non-limiting embodiments of the present disclosure relate to an information processing apparatus which is capable of acquiring the moving image in synchronization with editing which is performed with respect to an arrangement configuration of the still image including a plurality of pages.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reception section that receives an editing instruction with respect to an arrangement configuration of a still image including a plurality of pages, and a generation section that generates a moving image which corresponds to the arrangement configuration of the still image edited due to the editing instruction and which is acquired through combination with a moving image including playback sections corresponding to the still image.

BRIEF DESCRIPTION OF THE DRAWINGS

Exemplary embodiment(s) of the present invention will be described in detail based on the following figures, wherein:

FIG. 13A is a conceptual diagram illustrating a case where a sorting instruction with respect to the certain pages of the still image is received, and FIG. 13B is a conceptual diagram illustrating a state in which the relevant playback sections of the moving image are sorted in response to FIG. 13A.

DETAILED DESCRIPTION

An exemplary embodiment of the present invention will be described in detail with reference to the accompanying drawings.

Figure 1:
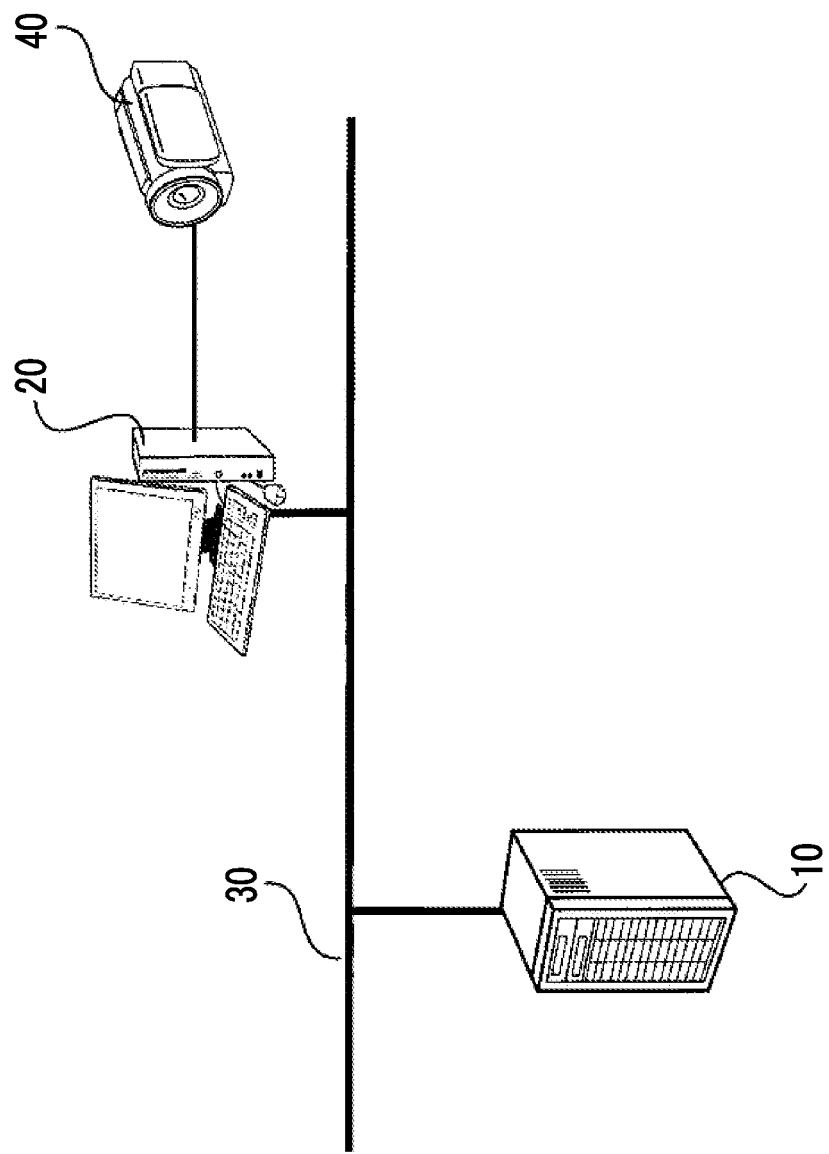
FIG. 1 is a system diagram illustrating a configuration of a multimedia content editing system according to an exemplary embodiment of the present invention.

FIG. 1 is a system diagram illustrating a configuration of a multimedia content editing system according to the exemplary embodiment of the present invention. As illustrated in FIG. 1, the multimedia content editing system according to the exemplary embodiment of the present invention is configured with an editing processing server 10, a terminal device 20, such as a personal computer, which are connected to each other through a network 30, and a video camera 40.

In a case where video data, which is acquired by recording a conference, a lecture, and a briefing session (in the exemplary embodiment, these are referred to as presentations) that are performed by exhibiting material images, such as the conference, the lecture, the briefing session, and presentations, is delivered to audiences as content, the multimedia content editing system according to the exemplary embodiment generates and edits multimedia content which is acquired by combining various types of content, such as a moving image, a still image, a sound, and text. Specifically, according to the multimedia content editing system of the exemplary embodiment, in a case where a presentation moving image, in which a still image including a plurality of pages is displayed on a monitor or a screen as a presentation material, is captured and editing is separately performed with respect to an arrangement configuration of the still image which is the presentation material, it is possible to generate a moving image which is synchronized with the editing, that is, which corresponds to the arrangement configuration of the still image.

The editing processing server 10 is an information processing apparatus installed with editing software used to generate the moving image synchronized with an arrangement configuration of the pages of the still image. Furthermore, the terminal device 20 acquires the moving image (moving image for a presentation) captured by the video camera 40, and outputs the moving image to the editing processing server 10. Meanwhile, it is possible to directly install the editing software in the terminal device 20, such as the personal computer, without installing the editing software in the editing processing server 10.

Figure 2:
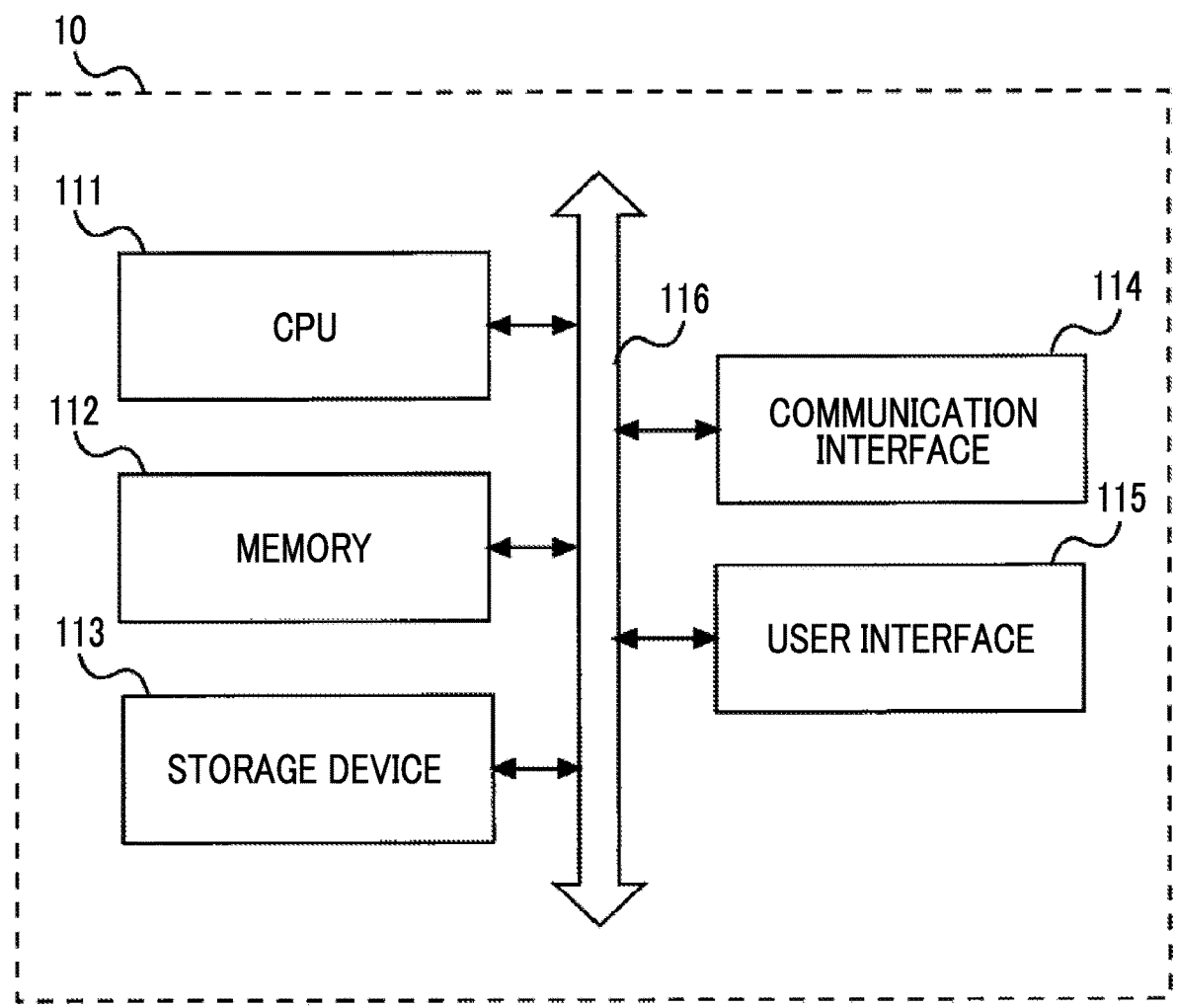
FIG. 2 is a diagram illustrating a hardware configuration of an editing processing server 10 in an image forming system according to the exemplary embodiment.

Subsequently, FIG. 2 illustrates a hardware configuration of the editing processing server 10 in an image forming system according to the exemplary embodiment. As illustrated in FIG. 2, the editing processing server 10 includes a CPU 111, a memory 112, a storage device 113, such as a Hard Disk Drive (HDD), a communication interface 114 that transmits and receives data to and from an external device, such as the terminal device 20, or the like through the network 30, and a user interface 115 that includes a touch panel, a liquid crystal display, and a keyboard. The components are connected to each other through a control bus 116.

The CPU 111 controls an operation of the editing processing server 10 by executing prescribed processing based on a control program which is stored in the memory 112 or the storage device 113. Meanwhile, in the exemplary embodiment, description is performed such that the CPU 111 reads and executes the control program which is stored in the memory 112 or the storage device 113. However, it is possible to store the program in a storage medium, such as a CD-ROM, and to provide the program to the CPU 111.

Figure 3:
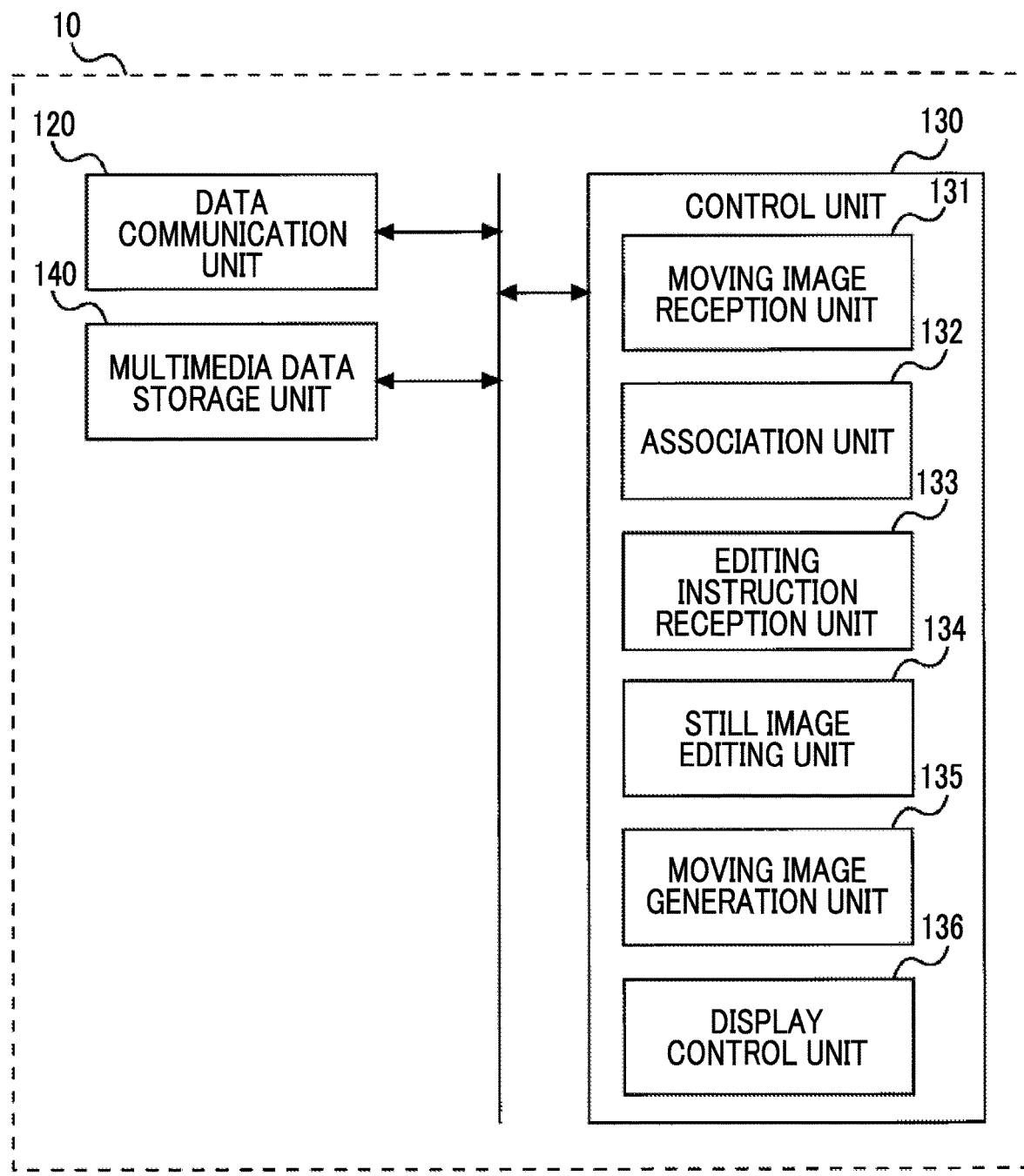
FIG. 3 is a block diagram illustrating a functional configuration of the editing processing server 10 of FIG. 2.

FIG. 3 is a block diagram illustrating a functional configuration of the editing processing server 10 which is realized in such a way that the control program is executed. As illustrated in FIG. 3, the editing processing server 10 according to the exemplary embodiment includes a data communication unit 120, a control unit 130, and a multimedia data storage unit 140.

The data communication unit 120 performs data communication with the terminal device 20 through the network 30.

The control unit 130 operates as a moving image reception unit 131, an association unit 132, an editing instruction reception unit 133, a still image editing unit 134, a moving image generation unit 135, and a display control unit 136 by controlling the operation of the editing processing server 10.

The multimedia data storage unit 140 stores moving image data and still image data on which it is desired to perform editing processing.

The moving image reception unit 131 receives the moving image relevant to the still image from the terminal device 20. Specifically, although being described later, a file of the moving image designated by the user is acquired from the terminal device 20 according to an instruction of the user.

The association unit 132 associates the respective pages included in the still image with respective playback sections included in the moving image which is received by the moving image reception unit 131. Specifically, in a case where images of specific areas designated by the user in the moving image coincide with images of the respective pages of the still image, the association unit 132 associates the respective pages of the still image with the respective playback sections included in the moving image. Meanwhile, here, it is assumed that the playback sections correspond to one playback period of the moving image in a period in which the images of the specific area included in the moving image do not change.

The editing instruction reception unit 133 receives an editing instruction with respect to the arrangement configuration of the still image including the plurality of pages from the user. Specifically, the editing instruction reception unit 133 receives a removal instruction with respect to the still image in page units, a duplication instruction to perform duplication and addition with respect to the still image in page units, and a sorting instruction to sort display order with respect to the still image in page units.

The still image editing unit 134 edits the arrangement configuration of the pages of the still image according to the editing instruction which is received by the editing instruction reception unit 133. The editing includes modification with respect to the arrangement configuration of the pages of the still image, that is, removal of the still image in page units, duplication in page units, and sorting in page units.

The moving image generation unit 135 generates the moving image which corresponds to the arrangement configuration of the still image that is edited by the still image editing unit 134 according to the editing instruction and which is acquired through combination with the moving image that includes the playback sections corresponding to the still image. Specifically, in a case where the arrangement configuration of the still image is edited, that is, modified due to the editing instruction, the moving image generation unit 135 generates the moving image corresponding to the arrangement of the edited still image by performing editing, that is, modification such that the arrangement configuration of the respective playback sections of the moving image corresponds to the arrangement configuration of the still image.

For example, in a case where a certain page of the still image is removed due to the removal instruction, the moving image generation unit 135 generates a moving image that does not include a playback section corresponding to the page, which is removed due to the removal instruction, of the still image, or removes the playback section corresponding to the page, which is removed due to the removal instruction, of the still image, from the moving image. In this case, the moving image generation unit 135 may add special effects to joint parts of front and back playback sections of the removed playback section of the moving image.

In a case where the certain page of the still image is duplicated and added due to the duplication instruction, the moving image generation unit 135 duplicates a playback section corresponding to the page, which is duplicated due to the duplication instruction, of the still image and adds the duplicated playback section to a designated location of the moving image.

In addition, in a case where the display order of the plurality of pages of the still image are sorted due to the sorting instruction, the moving image generation unit 135 sorts the order of the playback sections of the moving image so as to be playback order according to the display order of the still image which is sorted due to the sorting instruction.

Furthermore, in a case where a correspondence relation between the pages of the still image and the playback sections of the moving image is listed in time series and any of portions, in which modification is desired to be performed with respect to the moving image, is designated in the listed image, the moving image generation unit 135 restores the modified playback sections of the moving image to a state before the modification.

The display control unit 136 generates a moving image reception screen used to designate an editing target moving image, a still image editing instruction reception screen used to receive the editing instruction with respect to the still image, and a screen used to list the correspondence relation between the pages of the still image and the playback sections of the moving image in time series, and displays the screens on the user interface 115.

Figure 4:
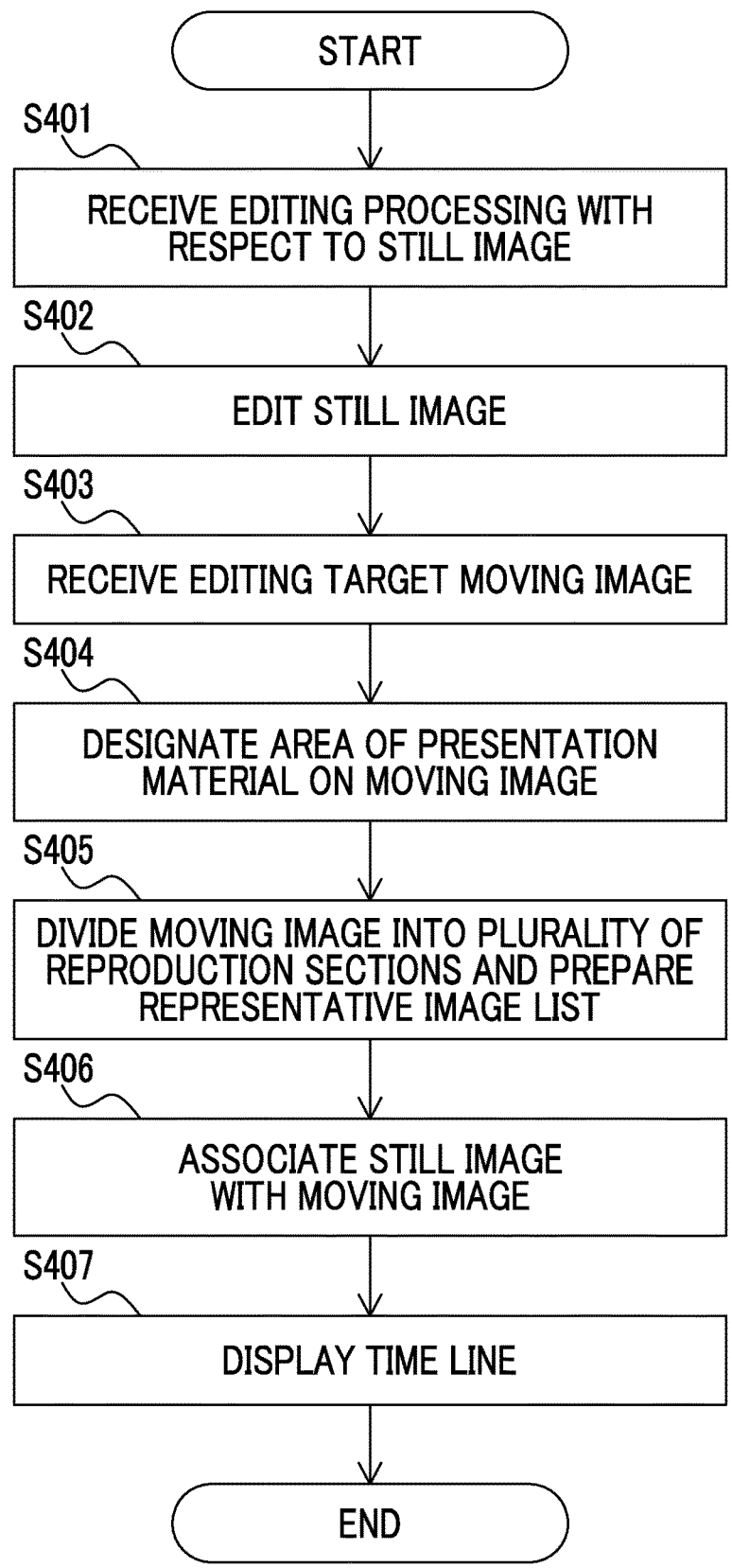
FIG. 4 is a flowchart illustrating a flow of editing processing in the editing processing server 10 according to the exemplary embodiment of the present invention.

Subsequently, the operation of the editing processing server 10 in the multimedia content editing system according to the exemplary embodiment will be described in detail with reference to FIGS. 4 to 10. Meanwhile, FIG. 4 is a flowchart illustrating a flow of editing processing in the editing processing server 10 according to the exemplary embodiment of the present invention. Meanwhile, in an example below, it is assumed that the moving image for the presentation is captured in advance by the video camera 40, data of the captured moving image is preserved as a moving image file by the terminal device 20, and a state is made in which acquisition by the editing processing server 10 is possible in a case where the instruction from the user exists. Meanwhile, it is assumed that the moving image for the presentation is captured by the video camera 40 which is fixed using a tripod or the like, and the presentation material, which is acquired by displaying the still image including the plurality of pages that will be described later on the screen or the monitor, is reflected in the captured moving image.

Figure 5A:
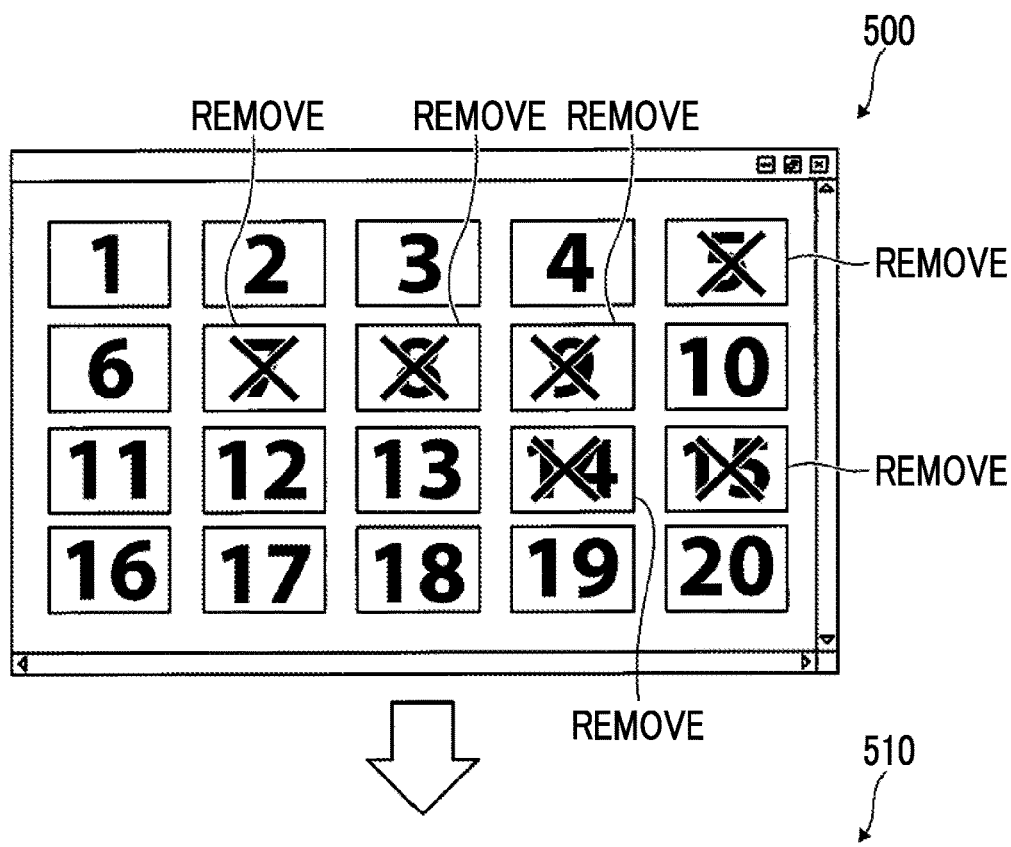
FIG. 5A is a diagram illustrating an example of an editing screen 500 which displays a list of respective pages of a still image including a plurality of pages using thumbnails.

First, in step S401, the editing instruction reception unit 133 of the editing processing server 10 receives the editing processing with respect to the still image. For example, as illustrated in FIG. 5A, the display control unit 136 generates an editing screen 500, in which a list of the respective pages of the still image including the plurality of pages is displayed using thumbnails, and displays the editing screen 500 on the user interface 115. For example, in the editing screen of FIG. 5A, first to twenty pages of the still image including the plurality of pages are sequentially displayed using the thumbnails.

Figure 5B:
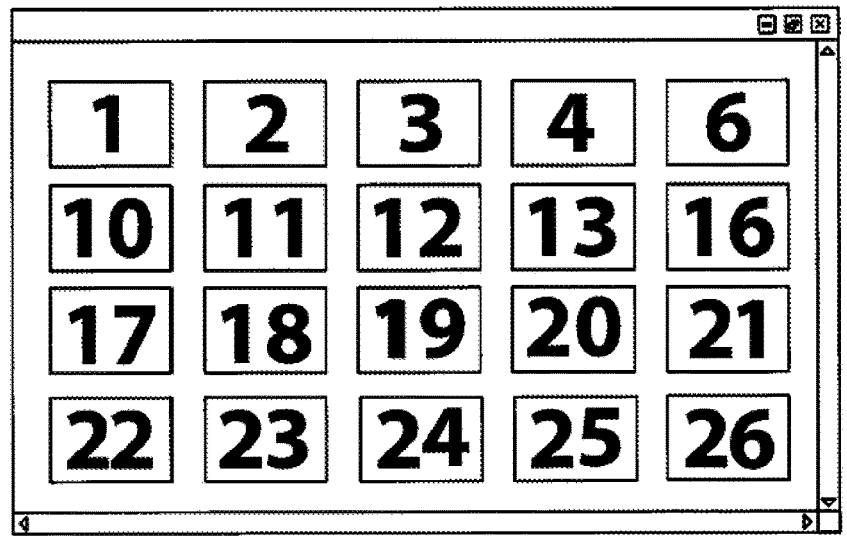
FIG. 5B is a diagram illustrating an example of the screen which displays the list of the respective pages of the still image acquired after editing is performed using the thumbnails.

The user manipulates the user interface 115 while visually recognizing a displayed still image list, and performs editing on the arrangement configuration of the pages of the still image. For example, the removal instruction to remove a page which is considered to be not necessary in page units is input. FIG. 5A illustrates a state in which an instruction to remove fifth, seventh to ninth, fourteenth, and fifteenth is input by the user. In step S402, the still image editing unit 134 removes a removal target page from the still image according to the removal instruction. At the same time, the display control unit 136 removes the page to which the removal instruction is provided from the editing screen 500 which is displayed using the thumbnails, generates a screen 510, which is acquired after editing is performed and in which the list of the respective pages of the still image acquired after the editing is displayed using the thumbnails as illustrated in FIG. 5B, and displays the generated screen on the user interface 115. FIG. 5B illustrates a state in which the initial fifth, seventh to ninth, fourteenth, and fifteenth pages are removed and subsequent pages sequentially exist subsequent to the pages which are not removed.

Figure 6:
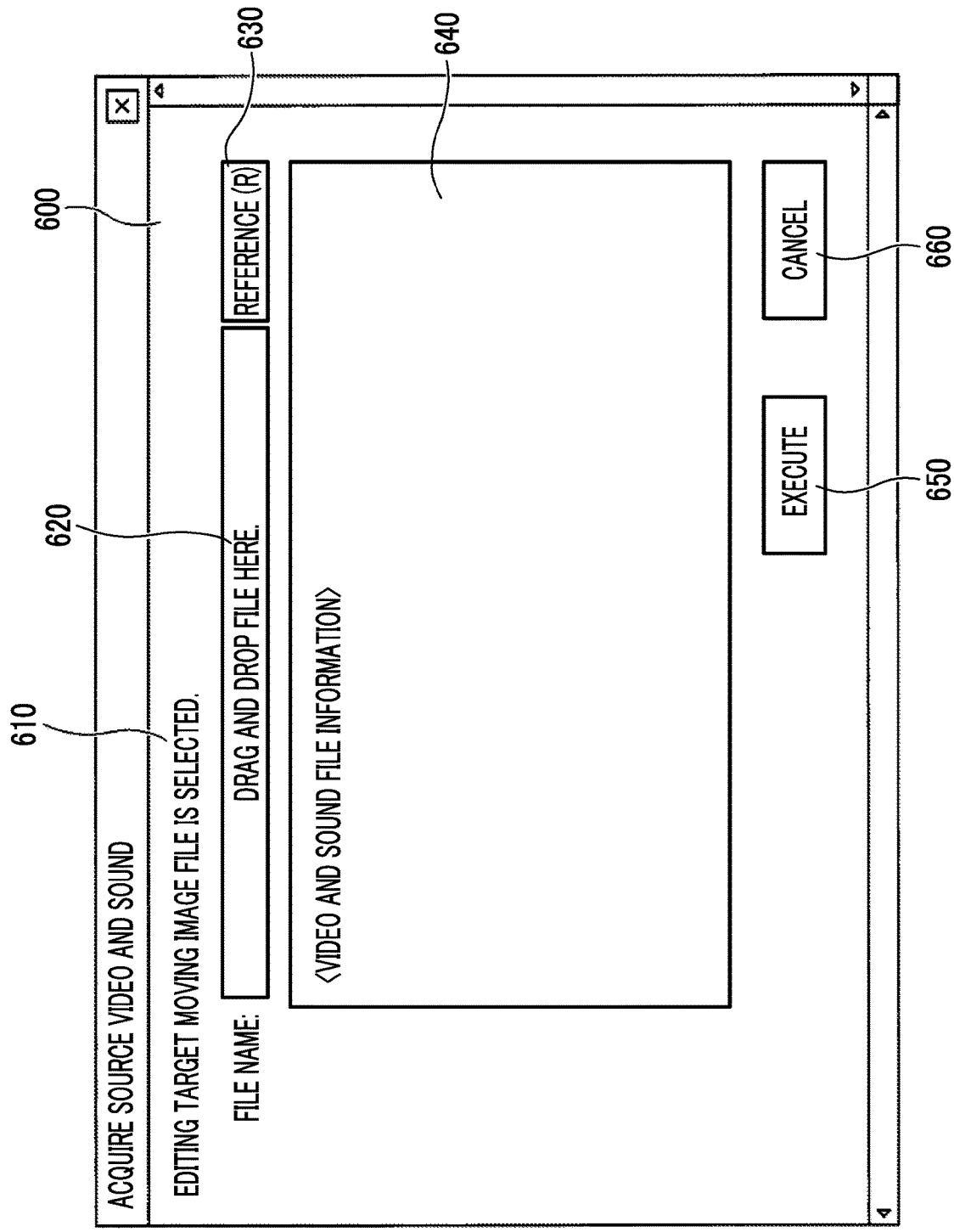
FIG. 6 is a diagram illustrating an example of a moving image file acquisition screen 600.

In step S403, the moving image reception unit 131 receives the editing target moving image relevant to the still image on which the editing is performed. Specifically, the display control unit 136 generates a moving image file acquisition screen 600 as illustrated in FIG. 6, and displays the moving image file acquisition screen 600 on the user interface 115. The moving image file acquisition screen 600 is configured with an explanation 610 "An editing target moving image file is selected.", a selected file name display field 620, a folder display button 630, a selected file information display field 640, and an execution button 650, and a cancellation button 660.

The user manipulates the user interface 115 while visually recognizing the displayed moving image file acquisition screen 600, and designates the editing target moving image file. Specifically, the user displays a folder of the terminal device 20 or the editing processing server 10, in which the editing target moving image is preserved, by pressing the folder display button 630, and designates the editing target moving image file from a moving image file list which is preserved in the folder. In the selected file information display field 640, detailed information relevant to the editing target moving image file which is selected at time, for example, moving image playback time, resolution, a writer, a preparation date and time of the moving image file, and the like are displayed. In addition, one frame, which is included in the moving image of the moving image file, may be displayed using the thumbnails.

In a case where the user visually recognizes the selected file information display field 640 and selects the execution button 650, the moving image file is designated as the editing target moving image file. In a case where the user selects the cancellation button 660, the processing is stopped and ends.

In a case where the editing target moving image file is designated, the association unit 132 instructs the display control unit 136 to display one frame, which is included in the moving image of the designated moving image file, in step S404. The display control unit 136 generates an area designation reception screen 700, which includes one frame of the moving image of the designated moving image file and receives designation of an area of the presentation material on the moving image, as illustrated in FIG. 7, and displays the area designation reception screen 700 on the user interface 115.

Figure 7:
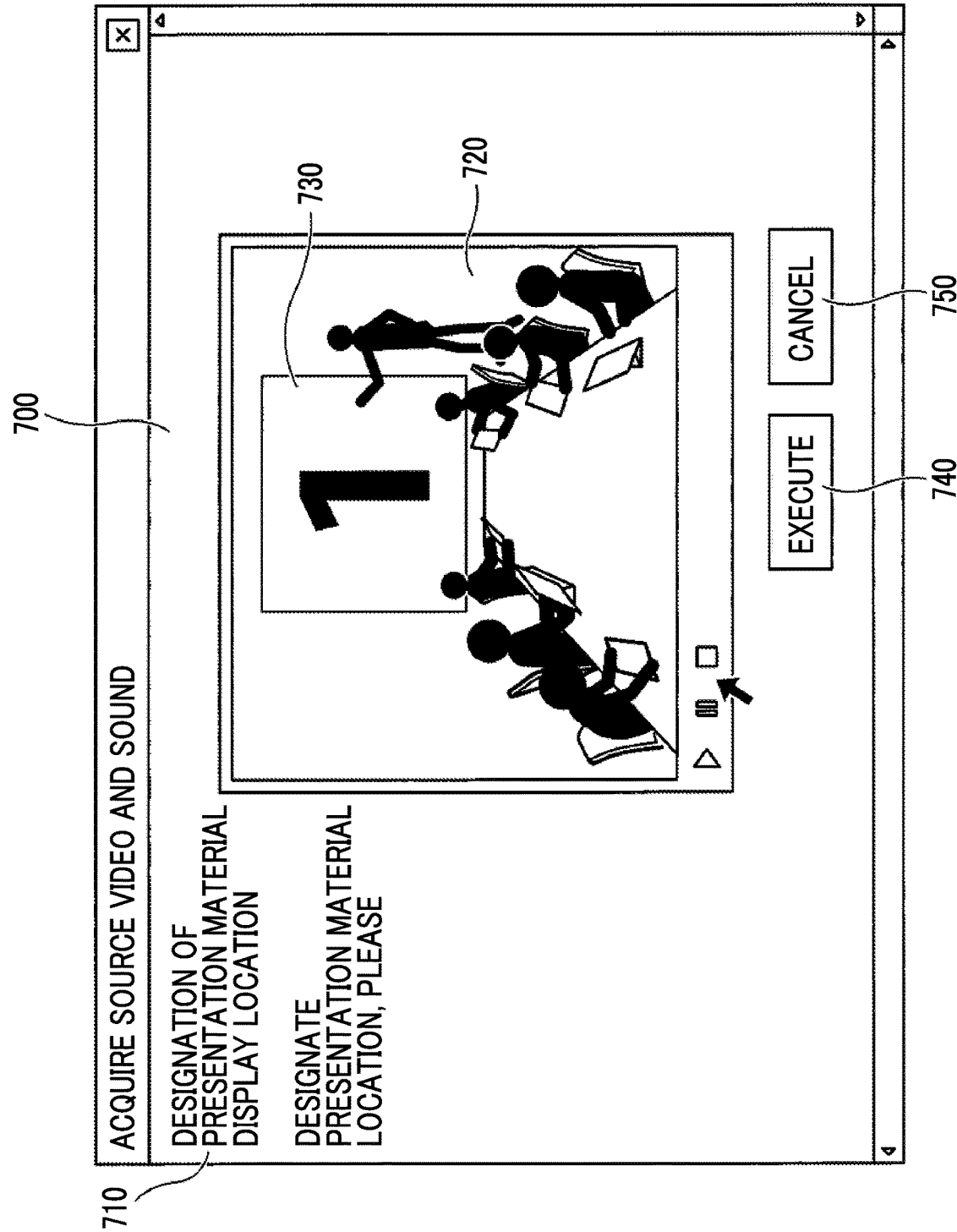
FIG. 7 is a diagram illustrating an example of an area designation reception screen 700.

The area designation reception screen illustrated in FIG. 7 is configured with an explanation 710 "designation of a presentation material display location" and "designate the presentation material location, please", a moving image display part 720, an execution button 740, and a cancellation button 750. In the moving image display part 720, a presentation material 730 included in the moving image is displayed. Meanwhile, the presentation material indicates a state in which the still image is displayed on the screen or the monitor.

The user designates an area of the presentation material 730 in the moving image display part 720 by manipulating the user interface 115. For example, in a case where the user specifies a rectangular area by designating an upper left corner and a lower right corner (or an upper right corner and a lower left corner) of the area of the presentation material, the association unit 132 stores coordinate information of the rectangular area in the memory 112. Meanwhile, the association unit 132 may automatically specify the area of the presentation material 730.

In step S405, the association unit 132 specifies a portion, in which an image of the area of the presentation material designated by the user significantly changes, as timing at which the presentation material is switched over. In addition, the association unit 132 specifies sections, in which the image of the area of the presentation material does not change, as respective playback sections included in the moving image, generates representative images for the respective playback sections, and generates an image list in which the representative images are sequentially arranged. A conceptual diagram at this time is illustrated in FIG. 8.

Figure 8:
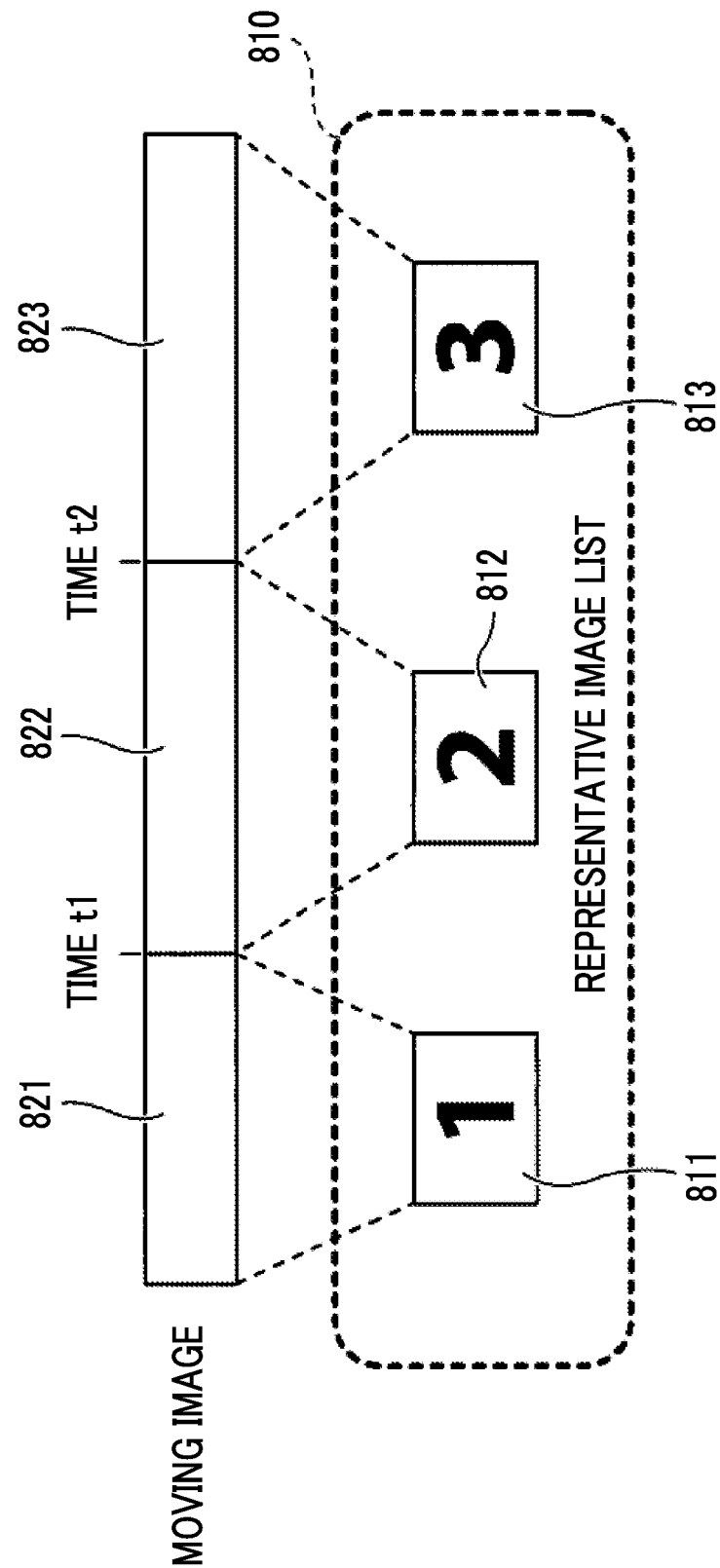
FIG. 8 is a diagram illustrating an example of a concept that a moving image is divided into a plurality of playback sections according to a change in an image of a presentation material.

FIG. 8 is a diagram illustrating a concept that the moving image is divided into the plurality of playback sections according to a change in an image of the presentation material. It is assumed that an image list 810 includes three representative images 811, 812, and 813. The respective representative images 811, 812, and 813 correspond to playback sections 821, 822, and 823 in the moving image, respectively. That is, in the playback section 821 of the moving image, a presentation material corresponding to the representative image 811 is displayed in the area of the presentation material included in the moving image, and the image of the presentation material is switched over to an image corresponding to the representative image 812 at time t1. Similarly, in the playback section 822 of the moving image, a presentation material corresponding to the representative image 812 is displayed in the area of the presentation material included in the moving image, and the image of the presentation material is switched over to an image corresponding to the representative image 813 at time t2.

In step S406, the association unit 132 compares the arrangement configuration of the still image, which is edited in steps S401 and S402, with the image list of the representative images generated based on the moving image. Furthermore, in a case where the representative images generated based on the moving image coincide with the images of the respective pages of the still image, the respective pages of the still image are associated with respective playback sections specified using the representative images generated based on the moving image, and the respective pages of the still image and the respective playback sections are stored in the memory 202. In contrast, in a case where there is an image, which does not correspond to the page of the still image edited in steps S401 and S402, in the image list generated based on the moving image, the moving image generation unit 135 removes the playback section, which corresponds to the representative image, of the moving image from the moving image. Furthermore, a subsequent part of the removed playback section is connected to a last part of a front playback section of the removed part such that a blank does not occur in the removed part. Therefore, the moving image, which does not include the playback section corresponding to the page, which is removed due to the removal instruction, of the still image, is generated.

Figure 9:
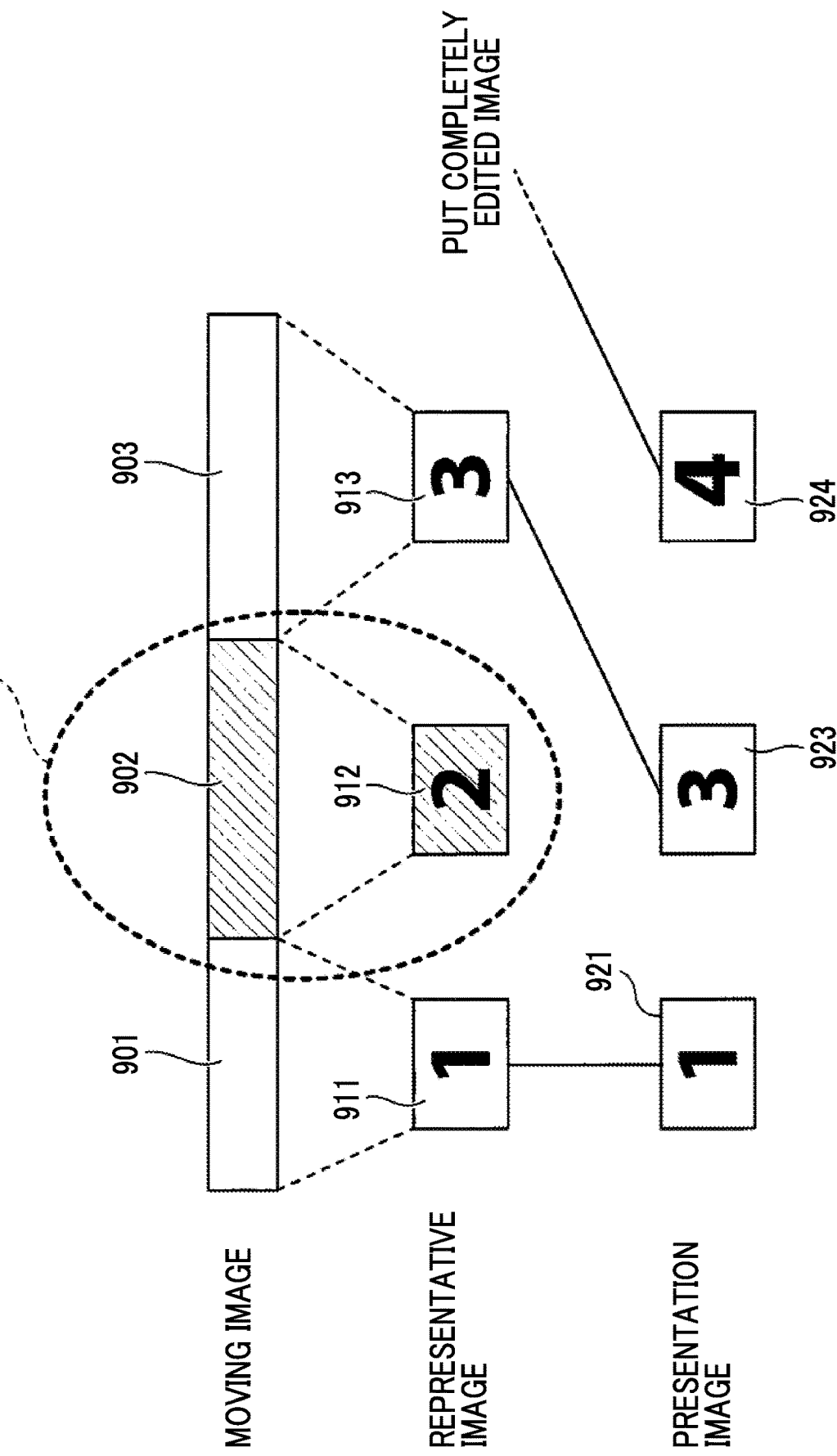
FIG. 9 is a conceptual diagram illustrating a case where a specific playback section of the moving image is removed in response to the editing performed with respect to an arrangement configuration of the still image including the plurality of pages.

Meanwhile, a conceptual diagram illustrating the case will be described with reference to FIG. 9. FIG. 9 is a conceptual diagram illustrating a case where a specific playback section of the moving image is removed in response to the editing performed with respect to the arrangement configuration of the still image including the plurality of pages. In FIG. 9, it is assumed that the moving image includes three playback sections 901, 902, and 903 expressed by representative images 911, 912, and 913, respectively. The edited still image corresponding to the playback sections 901, 902, and 903 includes a first page 921 corresponding to the representative image 911, a second page 923 corresponding to the representative image 913, and a third page 924 corresponding to another representative image which is not illustrated in the drawing. A page, which corresponds to the representative image 912, of the still image is removed. Therefore, the moving image is generated in which the second playback section 902 corresponding to the representative image 912 is removed by the moving image generation unit 135 and the third playback section 903 is continued immediately after the first playback section 901.

Meanwhile, the moving image generation unit 135 may insert the special effects between the first playback section 901 and the third playback section 903. Any of dissolve, wipe out/in, and fade out/in is used as the special effects. The special effects are performed such that a transition part between the first playback section 901 and the third playback section 903 does not become unnatural.

Figure 10:
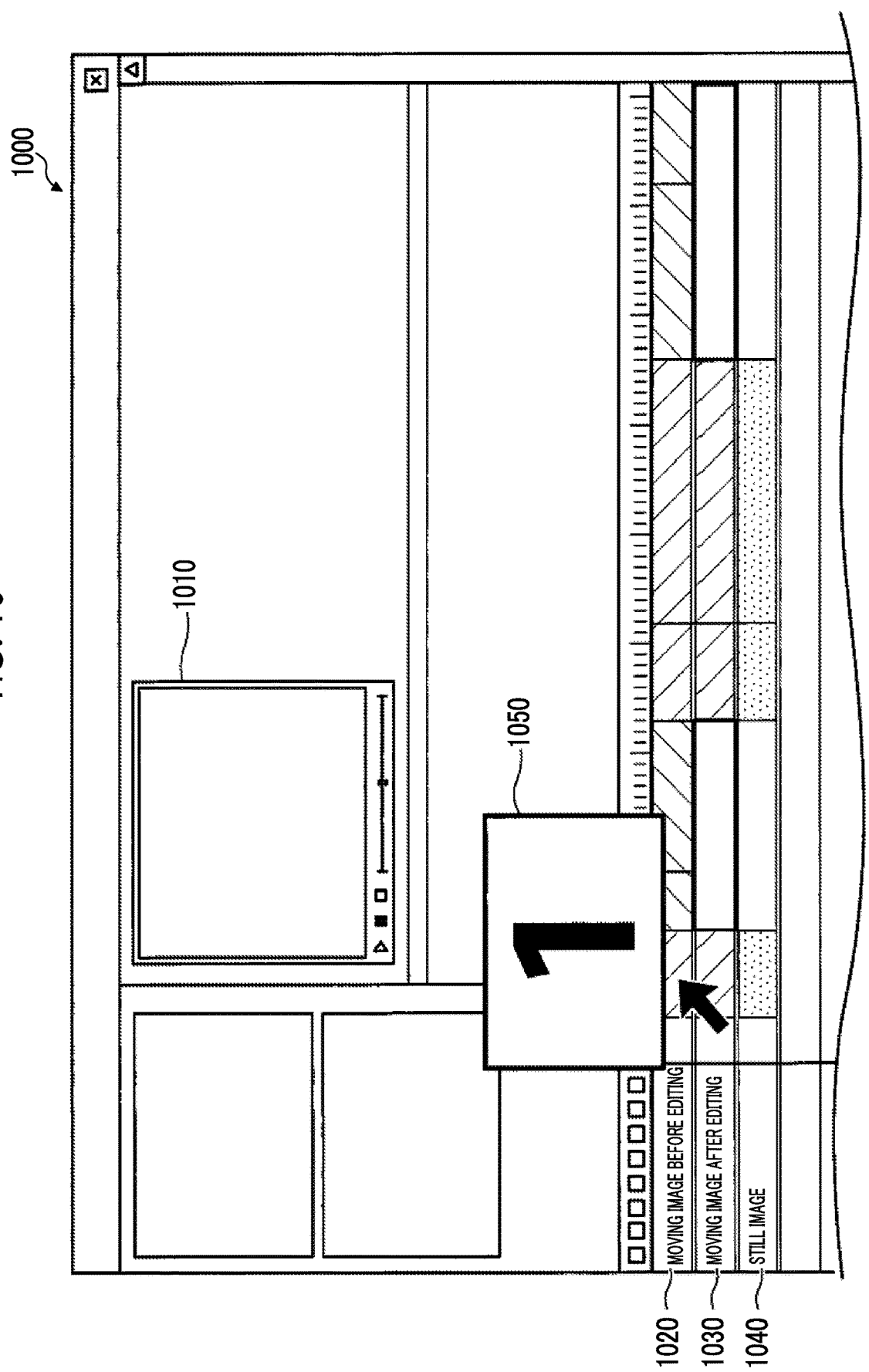
FIG. 10 is a diagram illustrating an example of a moving image editing screen 1000 in which a correspondence relation between the pages of the still image and the playback sections of the moving image are listed in time series.

Subsequently, in step S407, the display control unit 136 generates a moving image editing screen 1000 used to list the correspondence relation between the pages of the still image and the playback sections of the moving image in time series as illustrated in FIG. 10, displays the moving image editing screen 1000 on the user interface 115, and ends the processing.

The moving image editing screen 1000 includes a preview field 1010, a time line 1020 of the moving image acquired before the editing is performed, a time line 1030 of the moving image acquired after the editing is performed, and a time line 1040 of the still image. The preview field 1010 is used to selectively reproduce any of the moving image acquired before the editing is performed, the moving image acquired after the editing is performed, and the edited still image based on selection performed by the user. Horizontal axes of the time line 1020 of the moving image acquired before the editing is performed, the time line 1030 of the moving image acquired after the editing is performed, and the time line 1040 of the still image indicate time (elapse of time). In the time line 1020 of the moving image acquired before the editing is performed, the moving image acquired before the editing is performed is arranged and displayed for the respective playback sections. In the time line 1030 of the moving image acquired after the editing is performed, the moving image acquired after the editing is performed is arranged and displayed for the respective playback sections.

Meanwhile, as being understood in a case where the time line 1020 of the moving image acquired before the editing is compared with the time line 1030 of the moving image acquired after the editing is performed, the removed parts are displayed as blanks in the time line 1030 of the moving image acquired after the editing is performed but the removed parts are displayed using different colors through grayout (displayed using hashing in an opposite direction) in the time line 1020 of the moving image acquired before the editing is performed. That is, in a case where the editing is performed with respect to the playback sections of the moving image, the edited playback sections are displayed using a different display method from other playback sections in the listed images. In addition, in a case where any of the playback sections of the moving image is designated in the listed image, the display control unit 136 generates a representative image corresponding to the designated playback section and displays the representative image in a form of pop out 1050.

In the time line 1040 of the still image, display time of the respective pages, which are included in the still image acquired after the editing, is listed in time series. Meanwhile, parts, which correspond to the still image removed through the editing, are displayed as blanks.

Meanwhile, in a case where any of portions of modification performed with respect to the moving image is selected and designated in the listed image (time line 1020 of the moving image acquired before the editing is performed), the moving image generation unit 135 may restore the modified playback section of the moving image to a state acquired before the modification is performed. Specifically, in a case where a grayout part of the time line 1020 of the moving image acquired before the editing is performed, that is, a part corresponding to the removed part in the moving image acquired after the editing is performed is designated, and drag and drop is performed at a blank part of the time line 1030 of the moving image acquired after the editing is performed, the moving image generation unit 135 may restore to the state acquired before the modification is performed by inserting the playback section of the designated part into a relevant location of the moving image acquired after the editing is performed.

Meanwhile, in the above-described example, a case is described where the arrangement configuration of the respective pages of the still image is previously edited, the moving image relevant to the still image is subsequently received, and the arrangement configuration of the respective playback sections of the moving image is edited so as to correspond to the arrangement configuration of the still image. However, the exemplary embodiment of the present invention is not limited to the example. In a case where the plurality of playback sections included in the moving image are previously associated with the respective pages of the still image and the arrangement configuration of the still image is edited due to the editing instruction from the user, the arrangement configuration of the respective playback sections of the moving image is edited in response to the editing, and the moving image corresponding to the edited arrangement configuration of the still image may be generated. Meanwhile, the association may be performed in the editing processing server 10 or may be performed in the terminal device 20.

In addition, in the examples described with reference to FIGS. 4 to 10, the editing performed with respect to the arrangement configuration of the pages included in the still image is removal of the certain page included in the still image. However, the exemplary embodiment of the present invention is not limited to the removal, and the editing performed with respect to the arrangement configuration of the pages included in the still image may include addition through duplication in page units and sorting of the display order in page units, as will be described later.

Figure 11A:
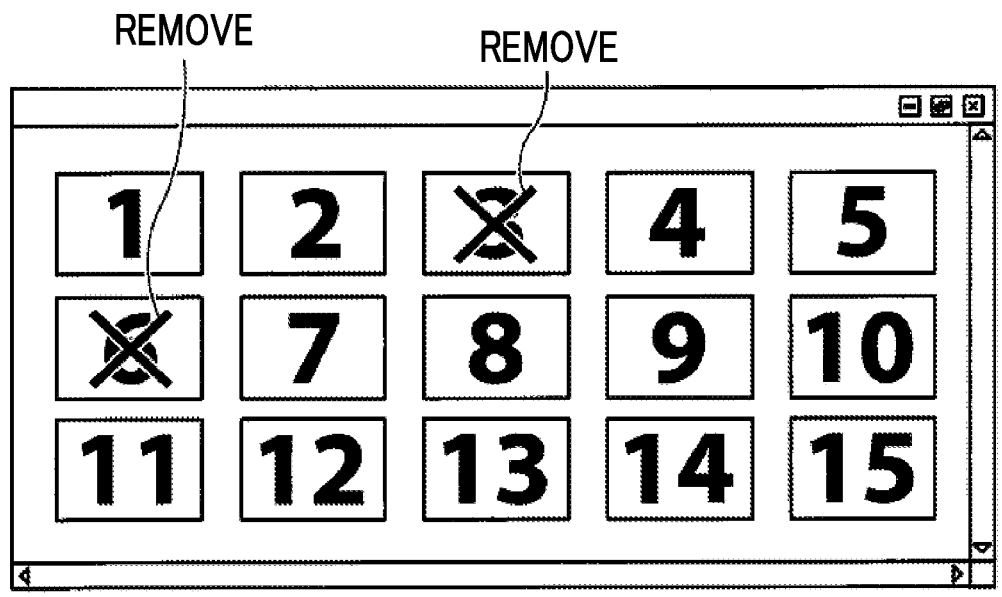
FIG. 11A is a conceptual diagram illustrating a case where a removal instruction with respect to certain pages of the still image is received.
Figure 11B:
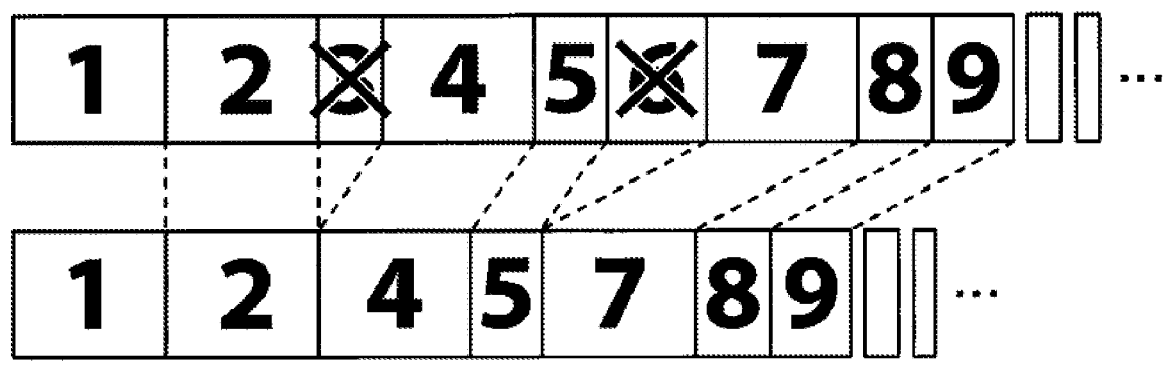
FIG. 11B is a conceptual diagram illustrating a state in which the relevant playback sections of the moving image are removed in response to FIG. 11A.

For example, it is assumed that there is a still image which includes first to fifteenth pages with which the playback sections of the moving image are associated, respectively, as illustrated in FIG. 11A. It is assumed that the editing instruction reception unit 133 receives a removal instruction to remove the third page and the sixth page of the still image. The still image editing unit 134 removes the third page and the sixth page, which are targets of the removal instruction, from the still image. As illustrated in FIG. 11B, the moving image generation unit 135 removes playback sections, which correspond to the third page and the sixth page of the still image, of the moving image, that is, a third playback section and a sixth playback section, respectively, and connects playback sections, which are subsequent to the third playback section and the sixth playback section, to immediate before playback sections.

As a result, the moving image that does not include the playback sections corresponding to the third page and the sixth page, which are removed due to the removal instruction, of the still image, that is, the moving image, in which the playback sections are arranged in order of the playback sections 1-2-4-5-7-8-9 . . . , is generated.

Figure 12A:
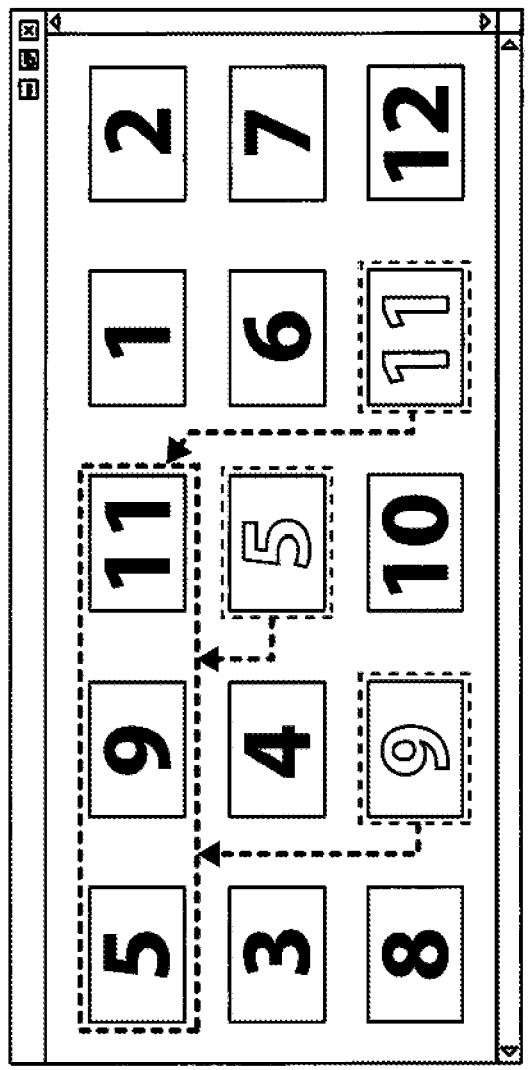
FIG. 12A is a conceptual diagram illustrating a case where a duplication instruction with respect to the certain pages of the still image is received.
Figure 12B:
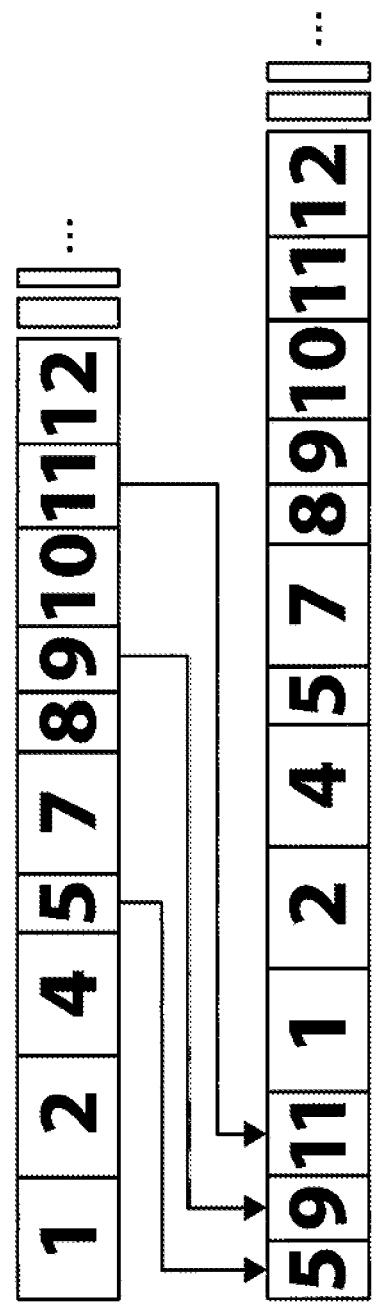
FIG. 12B is a conceptual diagram illustrating a state in which the relevant playback sections of the moving image are duplicated in response to FIG. 12A.

In addition, as another example, it is assumed that there is a still image which includes first to twelfth pages with which the playback sections of the moving image are previously associated, respectively, as illustrated in FIG. 12A. It is assumed that the editing instruction reception unit 133 receives the duplication instruction to duplicate the fifth page, the ninth page, and the eleventh page of the still image and inserts the pages to a head of the arrangement configuration of the pages of the still image. If so, the still image editing unit 134 duplicates the fifth page, the ninth page, and the eleventh page, which are targets of the duplication instruction, of the still image, and inserts the pages to the head of the arrangement configuration of the pages of the still image. As illustrated in FIG. 12B, the moving image generation unit 135 duplicates the playback sections, which correspond to the fifth page, the ninth page, and the eleventh page of the still image, of the moving images, that is, a fifth playback section, a ninth playback section, and an eleventh playback section, and inserts the playback sections to a head of the moving image.

As a result, the moving image in which the playback sections that corresponds to the fifth page, the ninth page, and the eleventh page, which are duplicated due to the duplication instruction, of the still image are added to a head part of the moving image acquired before the editing is performed, that is, the moving image, in which the playback sections are arranged in order of the playback sections 5-9-11-1-2-3-4-5-6-7-8-9-10-11-12, is generated.

In addition, as another example, it is assumed that there is a still image which includes first to fifteenth pages with which the playback sections of the moving image are previously associated, respectively, as illustrated in FIG. 13A. It is assumed that the editing instruction reception unit 133 receives the sorting instruction to move the thirteenth, fourteenth, and fifteenth pages of the still image without duplication, and inserts the pages to the head of the arrangement configuration of the pages of the still image. If so, the still image editing unit 134 executes sorting in which the thirteenth, fourteenth, and fifteenth pages, which are targets of the sorting instruction, of the still image are moved without duplication and the pages are inserted to the head of the arrangement configuration of the pages of the still image. As illustrated in FIG. 13B, the moving image generation unit 135 moves the playback sections, which correspond to the thirteenth, fourteenth, and fifteenth pages of the still image, of the moving image, that is, the thirteenth, fourteenth, and the fifteenth playback sections to the head of the moving image.

As a result, the moving image in which the playback sections that corresponds to the thirteenth, fourteenth, and fifteenth pages, which are moved due to the sorting instruction, of the still image are moved to the head part of the moving image acquired before the editing is performed, that is, the moving image, in which the playback sections are arranged in order of the playback sections 13-14-15-1-2-3-4- . . . (omission) . . . -12, is generated.

Meanwhile, in the exemplary embodiment, the generated and edited moving image is preserved in the editing processing server 10, and becomes a state which can be visibly recognized by a plurality of users who use the terminal devices (not illustrated in the drawing) connected to the network 30 or a state which can be delivered to the plurality of users.

Meanwhile, in a case where secret information or individual information is included in a certain page of the still image and the page of the still image is removed, a playback section, in which the secret information and the individual information are included, may be removed from the generated and edited moving image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a reception section that receives an editing instruction with respect to an arrangement configuration of a still image including a plurality of pages; and
    a generation section that generates a moving image which corresponds to the arrangement configuration of the still image edited due to the editing instruction and which is acquired through combination with a moving image including playback sections corresponding to the still image.

2. The information processing apparatus according to claim 1,
    wherein the moving image includes the plurality of reproduction sections which are associated with the respective pages of the still image in advance, and
    wherein, in a case where the arrangement configuration of the still image is edited due to the editing instruction, the generation section generates the moving image which corresponds to the edited arrangement configuration of the still image by editing an arrangement configuration of the respective playback sections of the moving image.

3. The information processing apparatus according to claim 1, further comprising:
    a moving image reception section that receives the moving image relevant to the still image; and
    an association section that associates the respective pages of the still image with the respective playback sections included in the moving image which is received by the moving image reception section,
    wherein, in a case where the arrangement configuration of the still image is edited due to the editing instruction, the generation section generates the moving image which corresponds to the edited arrangement configuration of the still image by editing an arrangement configuration of the respective playback sections of the moving image.

4. The information processing apparatus according to claim 3,
    wherein, in a case where an image of a specific area in the moving image coincides with images of the respective pages of the still image, the association section associates the respective pages of the still image with the respective playback sections included in the moving image.

5. The information processing apparatus according to claim 2,
    wherein the reception section receives a removal instruction with respect to the still image in page units, and
    wherein the generation section generates a moving image which does not include a playback section corresponding to a page, which is removed due to the removal instruction, of the still image.

6. The information processing apparatus according to claim 3,
    wherein the reception section receives a removal instruction with respect to the still image in page units, and
    wherein the generation section generates a moving image which does not include a playback section corresponding to a page, which is removed due to the removal instruction, of the still image.

7. The information processing apparatus according to claim 5,
    wherein the generation section removes the playback section corresponding to the page, which is removed due to the removal instruction, of the still image from the moving image.

8. The information processing apparatus according to claim 6,
    wherein the generation section removes the playback sections corresponding to the page, which is removed due to the removal instruction, of the still image from the moving image.

9. The information processing apparatus according to claim 7,
    wherein the generation section adds a special effect to a joint part of playback sections which are located at a front and a back of each of the removed playback sections.

10. The information processing apparatus according to claim 8,
    wherein the generation section adds a special effect to a joint part of playback sections which are located at a front and a back of each of the removed playback sections.

11. The information processing apparatus according to claim 2,
    wherein the reception section receives a duplication instruction to perform duplication and addition with respect to the still image in page units, and
    wherein the generation section duplicates a playback section corresponding to a page, which is duplicated due to the duplication instruction, of the still image, and adds the duplicated playback section to a designated location of the moving image.

12. The information processing apparatus according to claim 3,
wherein the reception section receives a duplication instruction to perform duplication and addition with respect to the still image in page units, and
wherein the generation section duplicates a playback section corresponding to a page, which is duplicated due to the duplication instruction, of the still image, and adds the duplicated playback section to a designated location of the moving image.

13. The information processing apparatus according to claim 2,
wherein the reception section receives a sorting instruction to sort a display order with respect to the still image in page units, and
wherein the generation section sorts an order of the playback sections of the moving image such that a playback order is made according to the display order of the still image which is sorted due to the sorting instruction.

14. The information processing apparatus according to claim 3,
wherein the reception section receives a sorting instruction to sort a display order with respect to the still image in page units, and
wherein the generation section sorts an order of the playback sections of the moving image such that a playback order is made according to the display order of the still image which is sorted due to the sorting instruction.

15. The information processing apparatus according to claim 1, further comprising:
a display section that displays an image which lists a correspondence relation between the pages of the still image and the playback sections of the moving image in time series.

16. The information processing apparatus according to claim 2, further comprising:
a display section that displays an image which lists a correspondence relation between the pages of the still image and the playback sections of the moving image in time series.

17. The information processing apparatus according to claim 15,
wherein, in a case where any of the playback sections of the moving image is designated in the listed image, the display section generates and displays a representative image in the designated playback section.

18. The information processing apparatus according to claim 17,
wherein, in a case where the editing is performed with respect to the playback section of the moving image, the display section displays the edited playback section using a different display method from other playback sections in the listed image.

19. The information processing apparatus according to claim 15,
wherein, in a case where any of portions of modification performed with respect to the moving image is designated in the listed image, the generation section restores the modified playback section of the moving image to a state before the modification.

20. A non-transitory computer readable medium storing a program, the program causing a computer, which forms an information processing apparatus, to perform
storing a still image including a plurality of pages;
receiving an editing instruction with respect to an arrangement configuration of the stored still image including the plurality of pages; and
generating a moving image which corresponds to the arrangement configuration of the still image edited due to the editing instruction and which is acquired through combination with a moving image including playback sections corresponding to the still image.

* * * * *